United States Patent

[11] 3,619,219

[72] Inventors: Heinz Bromer
Hermannstein/Kr., Wetzlar;
Norbert Meinert, Wetzlar; Hans-Jorgen
Preuss, Wetzlar, all of Germany
[21] Appl. No. 755,550
[22] Filed Aug. 27, 1968
[45] Patented Nov. 9, 1971
[73] Assignee Ernst Leitz GmbH
Wetzlar, Germany
[32] Priority Aug. 29, 1967
[33] Germany
[31] L 57316 VIb/32b

[54] NUCLEAR RADIATION ABSORBING GLASS
2 Claims, 1 Drawing Fig.
[52] U.S. Cl. .................................... 106/47 R,
250/83, 250/108, 252/478, 106/47 Q
[51] Int. Cl. ........................................ C03c 3/30,
C03c 3/14
[50] Field of Search ............................ 106/47;
250/108, 83 CD, 83 WS; 252/478

[56] References Cited
UNITED STATES PATENTS

| | | | |
|---|---|---|---|
| 2,747,105 | 5/1956 | Fitzgerald et al. | 106/47 UX |
| 2,859,163 | 4/1958 | Ploetz et al. | 106/47 |
| 2,988,523 | 6/1961 | Erskine et al. | 252/478 |
| 3,216,808 | 11/1965 | Bishop et al. | 106/47 |
| 3,250,729 | 5/1966 | Petzow et al. | 252/478 |

OTHER REFERENCES

Imadka " Glass Formation Range and Glass Structure" Advances in Glass Technology– Plenum Press NYC 1962 pp. 149– 164, page 152 relied upon

*Primary Examiner*—Helen M. McCarthy
*Attorney*—Krafft & Wells

ABSTRACT: In a glass composition containing boric acid as the glass former and further containing the oxides of beryllium and lithium for the purpose of slowing down and moderating nuclear radiation a certain percentage of tungsten oxide is introduced to the effect that the percentage of lithium oxide can then be increased to an amount which in pure $Li_2O/BeO/B_2O_3$-glasses has previously only been achieved with miniature melts of approximately 0.5 grams.

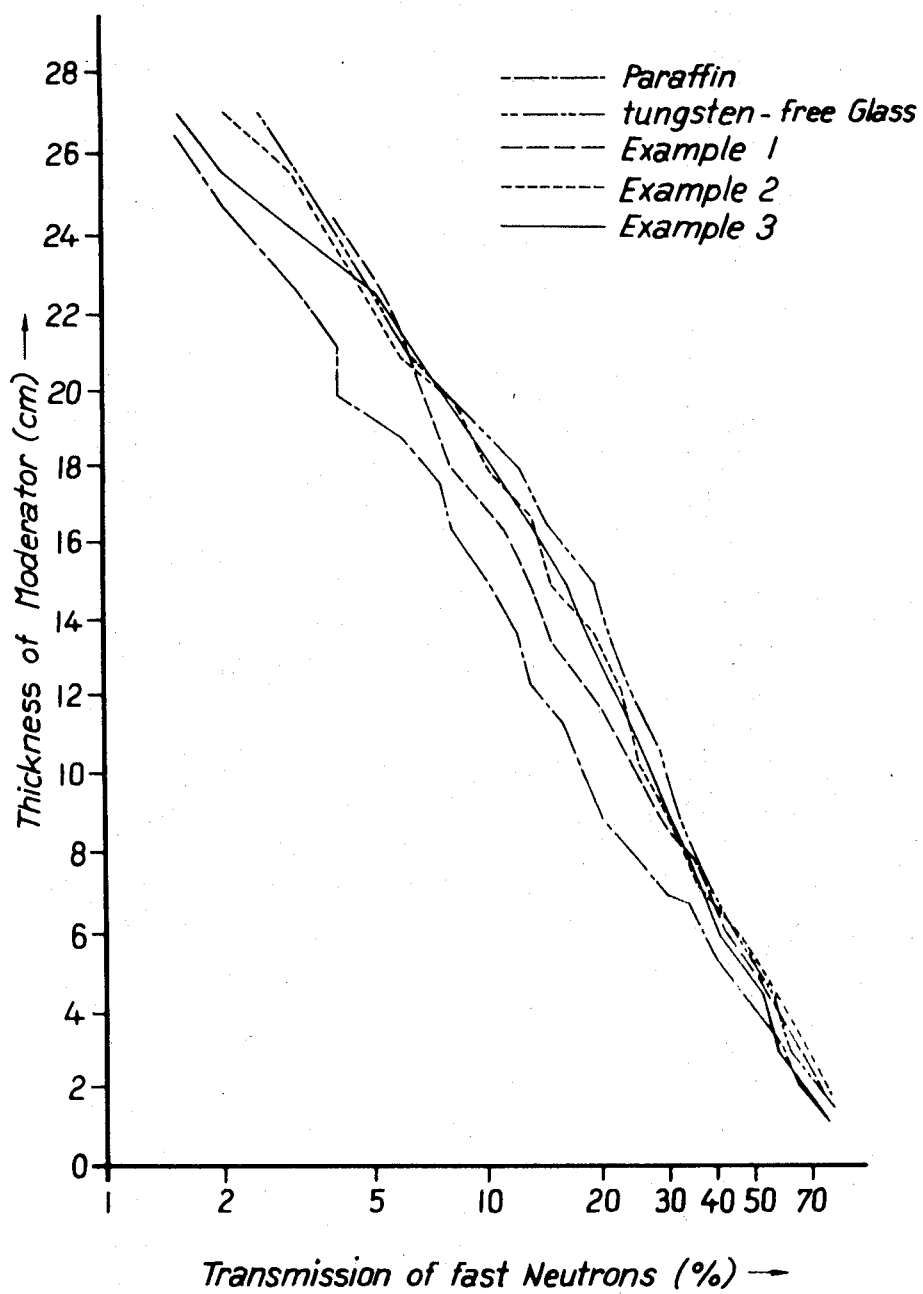

3,619,219

NUCLEAR RADIATION ABSORBING GLASS

BACKGROUND OF THE INVENTION

1 Field of the invention

The present invention relates to glass having the property of absorbing nuclear radiation, which glass may thus be used as a nuclear radiation shield in atomic research laboratories and plants.

2 Description of the Prior Art

In the field of atomic research it is already known that elements of low atomic weight are especially suitable for slowing down and moderating fast neutrons. Thus, for the viewing windows in atomic plants and laboratories glasses have already been suggested which consist essentially of the oxides of lithium and beryllium and of boric acid as the glass former.

The boron also having the additional task of capturing the neutrons after the latter have been slowed down to the thermal region. Glasses of this nature have already been described, for example, in the U.S. Pat. No. 2,747,105 and in the "Journal of the Society of Glass Technology" (Great Britain), Volume XL 1956, page 66T.

However since capturing of the neutrons by the boron is only possible after the neutrons have been slowed down to the thermal region considerably thick glass plates are required in the above-mentioned viewing windows if they are to protect the viewers effectively.

The main disadvantage in the composition of these known glass types resides in the fact that lithium oxide as well as beryllium oxide are soluble in boric acid only to a limited extent. A certain increase of the percentage of beryllium oxide is indeed possible if additional portions of aluminum oxide are contained in these glasses, however, a marked reduction of the thickness of the glass plates cannot be achieved this way, if full protection of the operators viewing through the windows is to be maintained.

SUMMARY OF THE INVENTION

Now, it has been discovered that by adding tungsten oxide to the glass composition the percentage of lithium oxide in these glasses can be increased to an amount which in pure $Li_2O/BeO/BO_3$-glasses can be achieved only in miniature melts of approximately 0.5 grams. Moreover, adding tungsten oxide has the advantage that tungsten itself is already capable of capturing neutrons having energies in the epithermal region. As a consequence thereof, it is possible safely to reduce the thickness of the protective shields up to one third. The effect of the tungsten can even be increased if to the glasses other of elements are added which are capable of capturing neutrons in the epithermal region as, for example, the oxide of samarium. The addition of the oxides of tungsten and samarium has the advantage that the fields of high absorption ranges superimpose and complement each other in the epithermal region.

DESCRIPTION OF THE APPENDING DIAGRAM

In the diagram is illustrated the transmission of fast neutrons in dependence on the glass thickness of three different glasses according to the invention, numbered 1, 2 and 3 in the below provided table. Further, the diagram outlines also the transmission of tungsten-free glass and of paraffin.

DESCRIPTION OF THE PREFERRED EMBODIMENTS

The glasses according to the invention consist generally of

| | | |
|---|---|---|
| 15–26% by wt. | or | 25–45 mol % $Li_2O$ |
| 0–10% by wt. | or | 0–18 mol % BeO |
| 60–78% by wt. | or | 40–60 mol % $B_2O_3$ and |
| 1–17 % by wt. | or | 0.2–5 mol % $WO_3$ |

To these compositions may be added up to 5 percent by wt. (or 2 mol percent $Sm_2O_3$, and in the following table seven different glass composition are listed which are composed according to the above stated general rule:

TABLE 1

| | $Li_2O$ | | BeO | | $B_2O_3$ | | $WO_3$ | | $Sm_2O_3$ | |
|---|---|---|---|---|---|---|---|---|---|---|
| | Percent by weight | Molecular percent | Percent by weight | Molecular percent | Percent by weight | Molecular percent | Percent by weight | Molecular percent | Percent by weight | Molecular percent |
| Glass No.: | | | | | | | | | | |
| 1 | 17.7 | 31.8 | 3.9 | 8.4 | 77.0 | 59.5 | 1.4 | 0.3 | | |
| 2 | 16.3 | 31.2 | 3.6 | 8.2 | 71.0 | 58.3 | 9.1 | 2.3 | | |
| 3 | 24.1 | 43.5 | 7.4 | 14.7 | 61.1 | 40.2 | 7.4 | 1.6 | | |
| 4 | 16.7 | 33.5 | 3.3 | 7.9 | 63.3 | 54.3 | 16.7 | 4.3 | | |
| 5 | 15.2 | 27.8 | 8.1 | 17.8 | 66.0 | 51.8 | 10.7 | 2.6 | | |
| 6 | 15.8 | 31.0 | 3.5 | 8.2 | 68.4 | 57.7 | 12.3 | 3.1 | | |
| 7 | 15.4 | 30.9 | 3.4 | 8.1 | 66.6 | 57.4 | 12.0 | 3.1 | 2.6 | 0.5 |

Now, it has been discovered that the moderator effect of these glasses practically compares to the moderator effect of corresponding tungsten-free glasses. For example, the glass types listed under No. 1 and 2 of the foregoing table correspond to a tungsten-free glass of the following composition:

$Li_2O = 18$ % by wt.

BeO = 4 % by wt.

$B_2O_3 = 78$ % by wt. Further, it is an additional advantage that the glasses according to the invention absorb the gamma radiation which occurs besides the nuclear radiation to a considerably higher degree than do the tungsten free glasses. A measure for this is provided by the coefficient of absorption $\mu$ which is listed below for three types of the glasses according to the invention of $60_{ce}$ gamma radiation along with the coefficient for paraffin and tungsten free glass.

| | |
|---|---|
| Paraffin | 0.043 cm.$^{11}$ |
| tungsten-free glass | 0.111 cm.$^{11}$ |
| example 1 | 0.114 cm.$^{11}$ |
| example 3 | 0.123 cm.$^{11}$ |
| example 2 | 0.125 cm.$^{11}$ |

With the gamma radiation which results from the capture of slow neutrons by the boron (which is the case in 93 percent the differences are even substantially greater.

The glasses according to the invention are particularly interesting with regard to their optical properties owing to their unusual partial dispersion. These values are set forth in the table below:

TABLE 2

| Glass No. | $n_e$ | $v_e$ | $\vartheta'_g \cdot 10^{-4}$ | $\Delta v$ |
|---|---|---|---|---|
| Tungsten-free glass Example: | 1.5643 | 63.6 | 4677 | –9.0 |
| 1 | 1.5656 | 63.3 | 4676 | –9.3 |
| 2 | 1.5712 | 61.1 | 4728 | –7.3 |
| 3 | 1.5772 | 59.2 | 4743 | –7.7 |
| 5 | 1.5732 | 57.8 | | |

All of the glasses according to the invention can be melted in conventional manner as is outlined below for one particular example concerning the melting process of a 500 gram batch; composition.

The well mixed batch is in portions put into the melting furnace at a temperature of 1100°C, subsequently melted for 20 minutes at 1200°C, and then stirred and cooled down to 950°. The melt is cast into aluminum molds preheated to 400°C.

What is claimed is:
1. A nuclear radiation absorbing glass composition consisting essentially of:

| | % by weight |
|---|---|
| $Li_2O$ | 15.2 to 24.1 |
| BeO | about 3.3 to 8.1 |
| $B_2O_3$ | about 61–77 |
| $WO_3$ | about 1.4 to 16.7 |

2. A nuclear radiation absorbing glass composition according to claim 1, and further containing up to about 2.6 percent by weight of the oxide of samarium.

UNITED STATES PATENT OFFICE
CERTIFICATE OF CORRECTION

PAGE ONE

Patent No. 3,619,219     Dated November 9, 1971

Inventor(s) HEINZ BRÖMER : NORBERT MEINERT: & HANS-JÜRGEN PREUSS

It is certified that error appears in the above-identified patent and that said Letters Patent are hereby corrected as shown below:

Block [72], line 1, "Bromer" should read - -Brömer- -.

Block [72], line 3, "Hans-Jorgen" should read - -Hans-Jurgen- -.

Block [56], line 9, "Imadka" should read - -Imaoka- -.

Abstract, lines 6 and 7, "pure L:$_2$O/BeO/B$_2$ - -$_3$-glasses" should read - -pure $Li_2O/BeO/B_2O_3$-glasses- -.

Column 1, line 59, "$Li_2O/BeO/BO_3$-glasses" should read - -$Li_2O/BeO/B_2O_3$-glasses- -.

Column 2, line 14, "(or 2 mol percent $Sm_2O_3$. and" should read - -(or 2 mol percent) $Sm_2O_3$, and- -.

Column 2, line 15, "glass composition" should read - -glass compositions- -.

Column 2, line 40, "$B_2$ $O_3$ = 78%" should read - -$B_2O_3$ = 78%- -.

Column 2, line 46, "invention of 60$_{Co}$ gamma" should read - -invention of $^{60}Co$ gamma- -.

UNITED STATES PATENT OFFICE
CERTIFICATE OF CORRECTION

Page Two

Patent No. 3,619,219  Dated November 9, 1971

Inventor(s) HEINZ BRÖMER: NORBERT MEINERT: & HANS-JURGEN PREUSS

It is certified that error appears in the above-identified patent and that said Letters Patent are hereby corrected as shown below:

Column 2, line 50, "cm"" should read -- $cm^{-1}$ --.

Column 2, line 51, "cm"" should read -- $cm^{-1}$ --.

Column 2, line 52, "cm"" should read -- $cm^{-1}$ --.

Column 2, line 53, "cm"" should read -- $cm^{-1}$ --.

Column 2, line 54, "cm"" should read -- $cm^{-1}$ --.

Column 2, line 57, "(which is the case in 93 percent" should read --(which is the case in 93 percent)--.

Column 2, line 74, "of a 500 gram batch;" should read --of a 500 gram batch--.

Claim 2, line 2, "about 26 percent" should read --about 2.6 percent--.

Signed and sealed this 20th day of March 1973.

(SEAL)
Attest:

EDWARD M. FLETCHER, JR.
Attesting Officer

ROBERT GOTTSCHALK
Commissioner of Patents